United States Patent
Subramanian et al.

(10) Patent No.: US 10,453,078 B2
(45) Date of Patent: Oct. 22, 2019

(54) OPEN INSERTION ORDER SYSTEM TO INTERFACE WITH AN EXCHANGE FOR INTERNET AD MEDIA

(75) Inventors: Anand Subramanian, New York, NY (US); Shanthi Sarkar, New York, NY (US)

(73) Assignee: PulsePoint, Inc., New York, NY (US)

( * ) Notice: Subject to any disclaimer, the term of this patent is extended or adjusted under 35 U.S.C. 154(b) by 534 days.

(21) Appl. No.: 12/507,513

(22) Filed: Jul. 22, 2009

(65) Prior Publication Data

US 2010/0023396 A1    Jan. 28, 2010

Related U.S. Application Data

(63) Continuation-in-part of application No. 11/933,187, filed on Oct. 31, 2007, now abandoned, which is a continuation-in-part of application No. 11/627,902, filed on Jan. 26, 2007.

(60) Provisional application No. 60/762,980, filed on Jan. 26, 2006, provisional application No. 61/082,676, filed on Jul. 22, 2008.

(51) Int. Cl.
*G06Q 30/02* (2012.01)

(52) U.S. Cl.
CPC ......... *G06Q 30/02* (2013.01); *G06Q 30/0249* (2013.01); *G06Q 30/0273* (2013.01)

(58) Field of Classification Search
USPC ............... 705/14, 14.46; 725/42; 709/209
See application file for complete search history.

(56) References Cited

U.S. PATENT DOCUMENTS

| | | | |
|---|---|---|---|
| 4,723,212 A | 2/1988 | Mindrum et al. |
| 4,914,590 A | 4/1990 | Loatman et al. |
| 4,996,642 A | 2/1991 | Hey |
| 5,105,184 A | 4/1992 | Pirani et al. |
| 5,353,218 A | 10/1994 | De Lapa et al. |

(Continued)

FOREIGN PATENT DOCUMENTS

| WO | 9946719 A1 | 9/1999 |
|---|---|---|
| WO | 2007120956 | 10/2007 |

OTHER PUBLICATIONS

The International Search Report, dated Mar. 2, 2010, in the related PCT application No. PCT/US2009/051407.

*Primary Examiner* — Saba Dagnew
(74) *Attorney, Agent, or Firm* — Cambridge Technology Law LLC; David E. Boundy

(57) ABSTRACT

An online exchange system and method supports open insertion order operations for online advertising markets displaying inefficiencies when delivering advertising media. Inefficiencies occur in an open ad exchange for online advertising when there is an under delivery of advertising content to identified target recipients. The online exchange system anticipates under deliveries and automatically fills instances of under delivery with impressions from the publisher inventory of the exchange according to fill requirements of the ad agency providing the advertising content (for example, budget limits and types of impressions to be used for filling the under delivery). The online exchange system also provides a mechanism for issuing a billing credit or discount to the agency if the bill for total impressions delivered according to the original campaign order and the automated under delivery fills exceeds a campaign budget.

17 Claims, 5 Drawing Sheets

(56) References Cited

U.S. PATENT DOCUMENTS

| | | | |
|---|---|---|---|
| 5,401,946 | A | 3/1995 | Weinblatt |
| 5,459,306 | A | 10/1995 | Stein et al. |
| 5,483,650 | A | 1/1996 | Pedersen et al. |
| 5,583,763 | A | 12/1996 | Atcheson et al. |
| 5,621,812 | A | 4/1997 | Deaton et al. |
| 5,636,346 | A | 6/1997 | Saxe |
| 5,696,962 | A | 12/1997 | Kupiec |
| 5,724,821 | A | 3/1998 | Lord et al. |
| 5,742,768 | A | 4/1998 | Gennaro et al. |
| 5,761,655 | A | 6/1998 | Hoffman |
| 5,822,748 | A | 10/1998 | Cohen et al. |
| 5,832,474 | A | 11/1998 | Lopresti et al. |
| 5,835,087 | A | 11/1998 | Herz et al. |
| 5,838,317 | A | 11/1998 | Bolnick et al. |
| 5,848,408 | A | 12/1998 | Jakobsson et al. |
| 5,855,008 | A | 12/1998 | Goldhaber et al. |
| 5,864,863 | A | 1/1999 | Burrows |
| 5,918,014 | A | 6/1999 | Robinson |
| 5,930,764 | A | 7/1999 | Melchione et al. |
| 5,943,648 | A | 8/1999 | Tel |
| 5,943,679 | A | 8/1999 | Niles et al. |
| 5,948,061 | A | 9/1999 | Merriman et al. |
| 5,961,593 | A | 10/1999 | Gabber et al. |
| 5,974,408 | A | 10/1999 | Cohen et al. |
| 5,987,454 | A | 11/1999 | Hobbs |
| 5,991,735 | A | 11/1999 | Gerace |
| 6,006,197 | A | 12/1999 | d'Eon et al. |
| 6,009,410 | A | 12/1999 | LeMole et al. |
| 6,016,487 | A | 1/2000 | Rioux et al. |
| 6,018,734 | A | 1/2000 | Zhang et al. |
| 6,026,409 | A | 2/2000 | Blumenthal |
| 6,044,376 | A | 3/2000 | Kurtzman, II |
| 6,081,750 | A | 6/2000 | Hoffberg et al. |
| 6,104,503 | A | 8/2000 | Shimura et al. |
| 6,134,532 | A | 10/2000 | Lazarus et al. |
| 6,185,614 | B1 | 2/2001 | Cuomo et al. |
| 6,236,978 | B1 | 5/2001 | Tuzhilin |
| 6,256,623 | B1 | 7/2001 | Jones |
| 6,269,361 | B1 | 7/2001 | Davis et al. |
| 6,308,202 | B1 | 10/2001 | Cohn et al. |
| 6,324,519 | B1 | 11/2001 | Eldering |
| 6,327,574 | B1 | 12/2001 | Kramer et al. |
| 6,327,590 | B1 | 12/2001 | Chidlovskii et al. |
| 6,339,761 | B1 | 1/2002 | Cottingham |
| 6,356,899 | B1 | 3/2002 | Chakrabarti et al. |
| 6,366,290 | B1 | 4/2002 | Dye et al. |
| 6,366,298 | B1 | 4/2002 | Haitsuka |
| 6,411,986 | B1 | 6/2002 | Susai et al. |
| 6,629,092 | B1 | 9/2003 | Berke |
| 6,801,945 | B2 | 10/2004 | Lin et al. |
| 6,804,659 | B1 | 10/2004 | Graham et al. |
| 6,826,572 | B2 | 11/2004 | Colace et al. |
| 6,907,566 | B1 | 6/2005 | McElfresh et al. |
| 7,035,812 | B2 | 4/2006 | Meisel et al. |
| 7,039,599 | B2 | 5/2006 | Merriman et al. |
| 7,076,443 | B1 | 7/2006 | Emens et al. |
| 7,085,682 | B1 | 8/2006 | Heller et al. |
| 7,376,714 | B1 * | 5/2008 | Gerken ............... G06Q 30/02 709/219 |
| 7,415,514 | B2 * | 8/2008 | Shiga ............................. 709/223 |
| 7,584,135 | B1 | 9/2009 | McAllister et al. |
| 2002/0016735 | A1 | 2/2002 | Runge et al. |
| 2002/0123912 | A1 | 9/2002 | Subramanian et al. |
| 2002/0184088 | A1 | 12/2002 | Rosenberg |
| 2003/0101454 | A1 * | 5/2003 | Ozer et al. ....................... 725/42 |
| 2003/0171990 | A1 * | 9/2003 | Rao ................. G06Q 30/0202 705/14.46 |
| 2004/0068435 | A1 | 4/2004 | Braunzell |
| 2004/0103024 | A1 * | 5/2004 | Patel ................. G06Q 30/02 705/14.53 |
| 2004/0153367 | A1 | 8/2004 | Lapstun et al. |
| 2005/0010475 | A1 | 1/2005 | Perkowski et al. |
| 2005/0246391 | A1 | 11/2005 | Gross |
| 2006/0282533 | A1 * | 12/2006 | Steelberg ........... G06Q 30/0264 709/224 |
| 2007/0022009 | A1 | 1/2007 | Cataldi |
| 2007/0055569 | A1 | 3/2007 | Subramanian et al. |
| 2007/0192356 | A1 | 8/2007 | O'Kelley |
| 2009/0037267 | A1 * | 2/2009 | Duggal et al. .................. 705/14 |
| 2009/0089151 | A1 * | 4/2009 | Protheroe et al. ............. 705/10 |

* cited by examiner

ADSDAQ FOR AGENCIES

Advertiser: Caribbean Cruises  Campaign: Winter Cruise Promotion

Open IO Report from 11/07 - 12/07

| Placement | Cover Underdelivery | Spend | Budget | Impressions | Clicks | Clickrate | Actions | Action Rate | CPC |
|---|---|---|---|---|---|---|---|---|---|
| ⊞ Natl Geographic | 100% | $33,250.00 | $35,000.00 | 6,650,000 | 90,000 | 1.35% | 712 | 0.79% | $0.37 |
| ⊞ ADSDAQ Open IO | | $1,750.00 | | 700,00 | 6,000 | 0.86% | 55 | 0.92% | $0.29 |
| Natl Geographic Total | | $35,000.00 | $35,000.00 | 7,350,000 | 96,000 | 1.31% | 767 | 0.80% | $0.36 |

Fig. 4

| Placement | Cover Underdelivery | Spend | Budget | Impressions | Clicks | Clickrate | Actions | Action Rate | CPC |
|---|---|---|---|---|---|---|---|---|---|
| ⊞ Natl Geographic | 100% ▾ | $33,250.00 | $35,000.00 | 6,650,000 | 90,000 | 1.35% | 712 | 0.79% | $0.37 |
| ⊞ ADSDAQ Open IO | | $1,750.00 | | 700,00 | 6,000 | 0.86% | 55 | 0.92% | $0.29 |
| ADSDAQ Open IO Discount | | ($250.00) | | | | | | | |
| Natl Geographic Total | | $35,000.00 | $35,000.00 | 7,350,000 | 96,000 | 1.31% | 767 | 0.80% | $0.36 |

ADSDAQ FOR AGENCIES

Advertiser: Caribbean Cruises  Campaign: Winter Cruise Promotion

Open IO Report from 11/07 - 12/07

Fig. 5

OPEN INSERTION ORDER SYSTEM TO INTERFACE WITH AN EXCHANGE FOR INTERNET AD MEDIA

CLAIM OF PRIORITY

This application is a non-provisional of U.S. Provisional Application No. 61/082,676, filed on Jul. 22, 2008 and entitled "New Open Insertion Order System To Interface With An Exchange For Internet Ad Media." U.S. application Ser. No. 11/933,187, filed on Oct. 31, 2007 and entitled "Online Exchange For Internet Ad Media," U.S. Ser. No. 11/627,902, filed on Jan. 26, 2007 and entitled "System and Method for Operating A Marketplace For Internet Ad Media And For Delivering Ads According to Traded Made in That Marketplace," and U.S. Provisional Application No. 60/762,980, filed on Jan. 26, 2006 and entitled "System and Method for Operating a Marketplace for Internet Ad Media and for Delivering Ads According to Traded Made in That Marketplace," are hereby incorporated by reference.

FIELD OF THE INVENTION

The present invention relates to a method and system that will monitor the delivery of identified advertising campaigns and fill instances of under delivery with impressions from the publisher inventory of the exchange. More particularly, this invention relates to a method of ensuring that advertisers and agencies that make a media buy are able to fulfill their advertising budget in its entirety. In related aspects of the inventive advertising method, the method can be used as an insurance program where if the publisher on the media buy catches up towards the end of the campaign, then the exchange will not charge for the over delivery. An Agency will have the control to specify the type of inventory that should be used to cover the under delivery as well as the amount of the under delivery. Other aspects of the inventive method relates to a computer-implemented system in an open exchange environment that will ensure delivery of advertising inventory so an agency can bill the client for the budget.

BACKGROUND OF THE INVENTION

Agencies have issues with their campaigns under delivering. When a media buy on the plan under delivers, Agencies scramble at the end of the campaign to try and fill the budget by making spot buys from other sources. This requires manual monitoring and intervention by media buyers at Agencies. As a result, the trading of Internet ad media is currently a burdensome and inefficient series of sequential negotiations between buyers and sellers, or their representatives. Often, when the Agencies do not catch the under delivery on time, a lot of money is left on the table if they are not able to find another source to fill the under delivery. It would be desirable for a system, method, or program to provide for an automated filling of ad media in the delivery shortfall of other media buys on the plan with inventory from the exchange.

SUMMARY OF THE INVENTION

The invention applies to a system and method that enables the development and operation of an automated exchange that acts as an insurance program for delivery shortfall making sure that the campaign budget goals are achieved. If the other media buy recovers the shortfall before the flight end date, the exchange will not charge the agency for the excess media.

By providing interactive, adaptive, and automated filling of ad media in the delivery shortfall of other media buys on the plan with inventory from the exchange this invention has immediate application in advertising space of the World Wide Web ("web", "Internet", or "online") at all levels.

BRIEF DESCRIPTION OF THE DRAWINGS

For a better understanding of the nature, objects, and processes involved in this invention, reference should be made to the detailed description taken in conjunction with the accompanying drawings, in which:

FIG. 4. is an example of a screenshot interface by which a buyer can specify the percentage of under delivery to be covered by the online exchange system of FIG. 1;

FIG. 5. is an example of a screenshot interface by which the online exchange system of FIG. 1 will not charge the buyer for any delivery above the campaign budget.

DESCRIPTION OF THE INVENTION

While publishers and advertisers are users of the system embodying the present invention, an end-user is the target of the advertising and is typically an individual accessing a web page and reading its content and advertisements. The aspects, features and advantages of the present invention will become better understood with regard to the following description with reference to the accompanying drawings.

Figure 1:
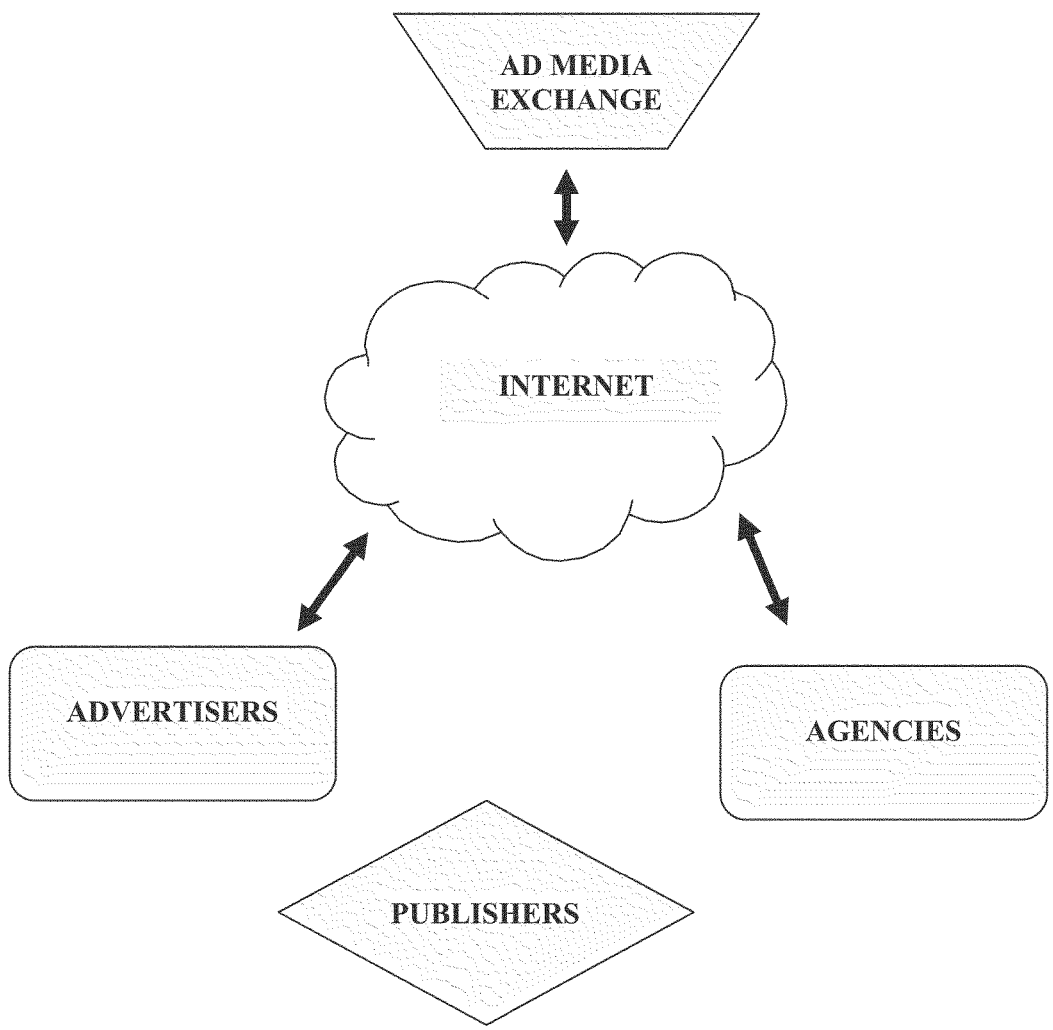
FIG. 1. is a schematic view of an online exchange system for trading ad media according to the present invention.

As depicted in FIG. 1, an online exchange system for trading ad media consists of a website linked to a central computer (ad media exchange server) connected to a computer network (in this case the Internet), databases and an information system based on applications for networked computers, where the interaction of advertisers, agencies and publishers is allowed for exchanges of ad media in advertising campaigns. The system is based mainly on a website on the Internet that is connected to the main computer (server) and store functions and administer access of other remote computers (media traders) through the website.

Figure 2:
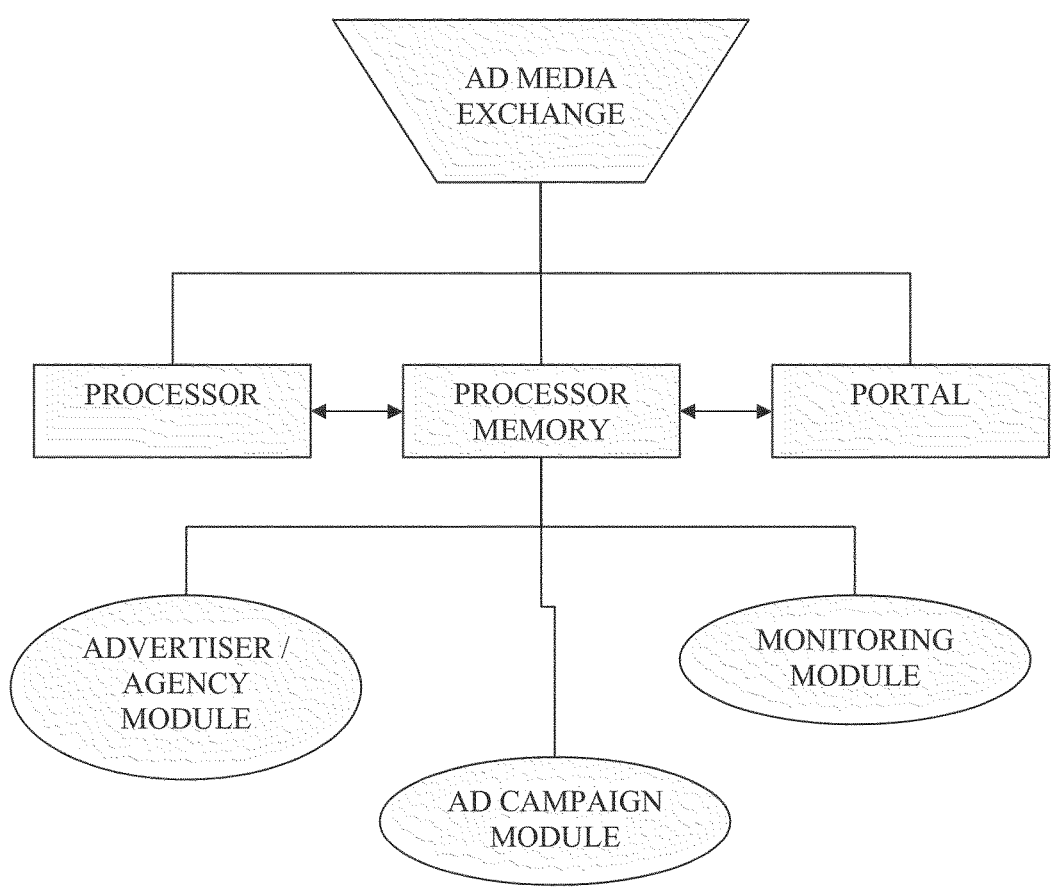
FIG. 2. is a schematic drawing of the main modules of the online exchange system of FIG. 1.

Generally, the fundamental parts of this system are the advertisers, agencies, publishers, and the ad media exchange system. As illustrated in FIG. 2, the ad media exchange system includes the following subsystems: a processor; Internet exchange portal, and processor memory. The memory stores several modules that help facilitate the actions of the exchange. These modules include an advertiser or agency module; an ad campaign module; and a monitoring module. The advertiser or agency module is related to advertisers or agencies buying media from a publisher. The ad campaign module is related to establishing an ad campaign in an ad server. The monitoring module is responsible for monitoring an ad campaign delivery and for automatically filling in a delivery shortfall of media buys of the campaign with media inventory from exchange. Additional modules (not shown) are provided for ad media classification, accessing information, tag routing, transacting business and pricing.

The Internet exchange portal interacts with the modules of the system for the exchange of campaign delivery information.

The modules of exchange are composed of computer programs necessary to guarantee the perfect operation of the exchange system, to assure confidentiality of the data contributed by the participants, as well as the correct application of its service demands offered by the system, and to obtain what is required to maintain (sign up, modifications, unsubscribe) the general parameters of the system, interfaces with banks and forms of collections, data mining, utilities, anti-virus, anti-spyware, anti-hackers, report, registration of participants, agreements, regulations, e-mail and general services of aid and benefits to users, among others.

The following further describes embodiments of a method and system that manage a marketplace where parties may buy, sell, and manage ad media; as well as manage categorization and delivery of ad requests according to specifications provided by the respective owning parties (e.g., publisher or advertiser or agents thereof).

Different embodiments encompass the following elements:

1. A set of publishers, each representing a property (i.e., advertising space on a webpage), a network, an aggregation of properties, that contains pages where ads may be shown.

2. A set of advertisers and/or agencies, each owning one or more advertisements that the advertiser wishes to have displayed to end-users under certain defined conditions.

3. An ad media exchange marketplace (herein referred to as "exchange marketplace or "exchange" interchangeably and without differentiation), where parties may buy and/or sell media with each other according to free market prices, using standardized or customized tools.

4. An available Ad Budget translated into a required inventory of ad media to fill that budget based on the payment method. If the payment for the ad inventory is on a CPM ("Cost Per Thousand") basis, the required inventory to fill the budget is a projected quantity of ad requests to be filled as users request and view publisher pages, where the pages contain space available for advertising. (If advertiser is buying on CPC ("Cost Per Click"), the quantity to fill is the number of clicks the ad receives. If they buy on a CPA ("Cost Per Action"), the quantity is the number of conversions)

5. A set of media traders (e.g., media buyers and/or sellers), each able to transact media purchases and sales on the marketplace of the present invention.

6. A media classification module, which is operable to perform real-time classification of the ad requests comprising the inventory of ad media. The module is implemented in hardware, software, or a combination thereof, and is operative in a computer-based Internet capable system.

7. A set of media "buckets," each comprising a part of the complete ad media inventory managed by the system, where each bucket contains a quantifiable inventory of media. Each member of the ad media inventory has the same properties (e.g., such as page category, publisher site, time of day or month or year, and geographic location of the end-user), or a subset thereof being a constituent of the bucket.

8. A set of market accessor tools, each such tool enabling its user to perform a combination of: 1) transacting business (e.g., placing buy and sell orders) on the marketplace embodying the present invention; 2) viewing available media buckets, their properties, quantity available, and current market prices; and 3) viewing and managing media currently owned by that user or the party he represents. Additional information and tools may also be provided by these tools such as detailed status of executed trades that are currently partially fulfilled. By way of example, if the trader has executed and cleared a buy order for up to one million impressions in a particular media bucket to be delivered during the month of May 2008, on May 10th the market accessor tool can show partial delivery and prorated charges according to ad requests routed to his ad server by the exchange during the first 10 days of the month. The market accessor tool can be implemented as hardware, software or a combination of hardware and software.

9. A tag routing module able to receive, classify (via the classification module) and route ad requests in real time to the ad server(s) specified by media owners.

The preferred embodiment of the present invention is a method for supporting open insertion order ("IO") operations for online advertising markets. FIG. 1 is a flowchart diagram that depicts this method. This method is predicated on media exchange activity that takes place between buyers and sellers of ad media on the marketplace of the Internet.

Figure 3:
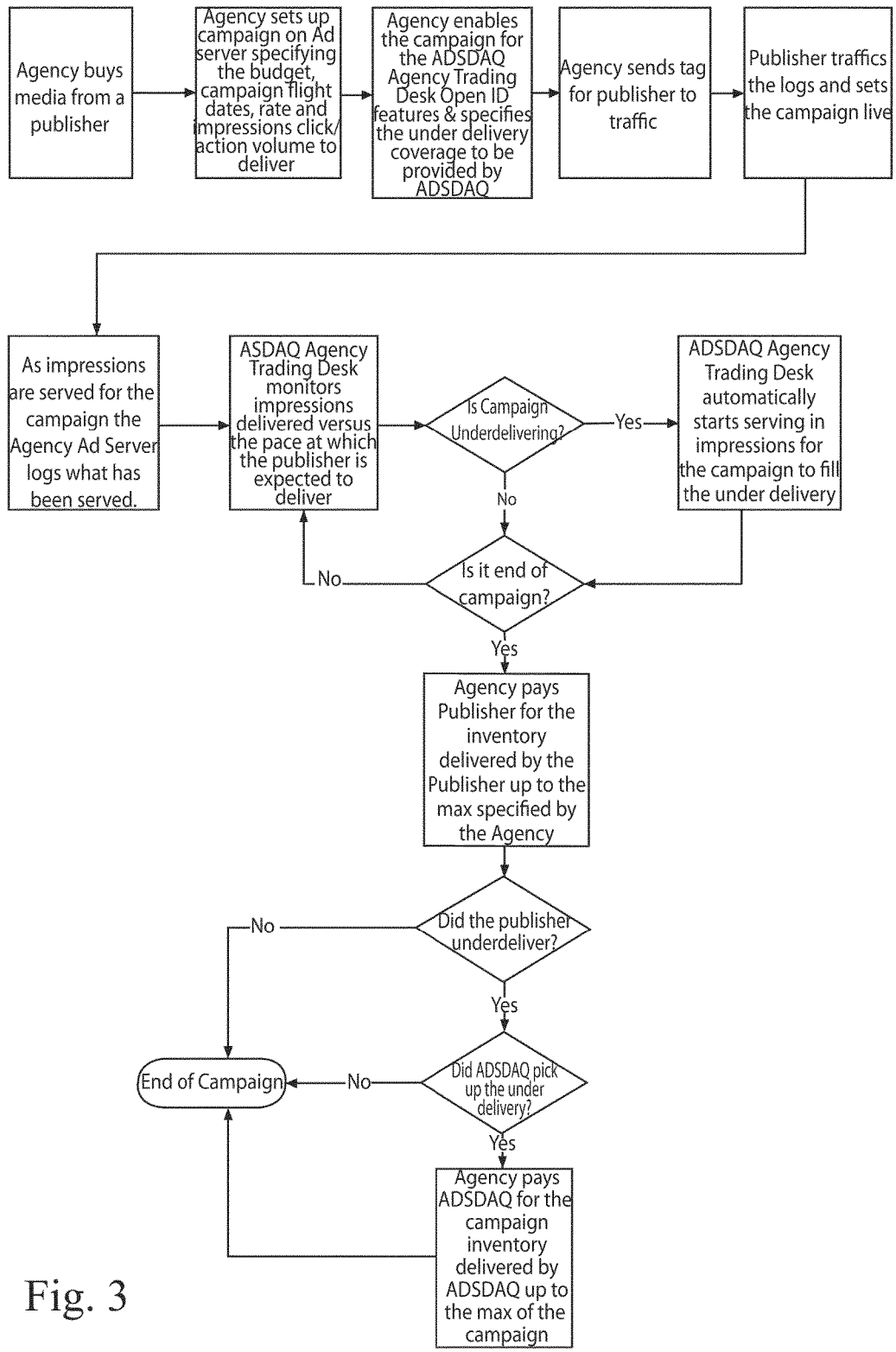
FIG. 3. illustrates a flowchart showing the required steps for the automated monitoring of the under delivery and the steps required to fill the under delivery with inventory from the online exchange system of FIG. 1.

Standard producers of online ad-request inventory are publishers. They own or operate websites that users visit using web browsers, and they allocate space on those pages where advertisements may be added. Consumers of online ad-request inventory are Advertisers. They offer products or services online, and they create advertisements for those offerings which they desire to show to Internet users. Those advertisements are then added into the publishers' pages so that users see them as they browse. Each time an individual user browses to a publishers' page that contains pre-allocated space for advertising, an Ad Request to deliver an ad to fill that allocated space can be made to an Ad Server either by the user's browser or by the Publisher. As depicted in the flowchart of FIG. 3, the exchange is initiated when Agency purchases media from a publisher.

The Agency can then set up campaign on an Ad server specifying the budget, campaign flight, dates, rates and impression/click action volume to deliver. When the ad media is considered in terms of the number of expected ad requests, the inventory is typically quantified as a particular number of Ad Impressions. Ad Impressions are priced as a CPM. Additionally, because a click may or may not result each time an ad is shown to a user, inventory may also be quantified as a particular number of expected Ad Clicks, and could be priced as a CPC. Inventory also may be quantified and priced in other standard ways known to those in the relevant art, such as a number of Conversions and a CPA which measures the advertising cost per users who purchase or subscribe to the advertised product or service.

The next step in the exchange process involves the Agency enabling the campaign for the exchange Agency Trading Desk Open IO feature. At this step the degree of under delivery coverage to be provided by exchange is specified. FIG. 2 demonstrates this step, wherein the Agency will specify the percentage of under delivery to be covered by the exchange. The Agency will also specify the type of inventory to be utilized to cover the inventory. For example, the Agency can specify that the under delivery should be filled with ad inventory on pages about travel read by users in the United States.

FIG. 4 is a screenshot illustrating an example wherein the Agency has purchased inventory from National Geographic for demonstration purposes of this application. As shown in the screenshot, the Agency will indicate in the drop down option named "Cover Under Delivery" how much of National Geographic's budget can be utilized by the exchange to cover National Geographic's under delivery. This can be a range from 0-100%. For example, assume the Agency specifies that 10% of National Geographic's Budget can be utilized by the exchange to fulfill any under delivery by National Geographic. Assume the budget to be run by National Geographic is $30,000. Given this scenario, the exchange can fill up to $3,000 worth of under delivery. So, as the campaign runs, the present invention will monitor the pace of delivery by National Geographic. If the pace is trending for National Geographic to deliver $28,000 worth of media, the exchange will run $2,000 worth of media to fill the under delivery to reach the total budget of $30,000. If National Geographic is trending to deliver only $25,000 of inventory, the exchange will deliver the max allocated of $3,000 to fill the under delivery. In this scenario, only $28,000 of the total $30,000 available budget will be delivered. In another Scenario, assume National Geographic starts the campaign trending to delivery only $25,000 and the exchange backfills with the maximum $3,000 worth of inventory. Then, towards the end of the campaign, National Geographic catches up and delivers $28,000 worth of inventory. In this case, the exchange will only invoice the Agency $2,000 of under delivery and will not charge the $1,000 of excess delivery over the target budget of $30,000. In this scenario, the full $30,000 of available budget was spent. This is only for illustrative purposes. This invention can be embodied in a variety of other ways where the Agency can specify a maximum dollar budget that can be utilized to cover the under delivery instead of a percentage of overall budget. The Agency will also be able to specify other parameters of the type of inventory that can be used to fulfill the under delivery. These parameters include targeting items such as geographic targeting, frequency caps, content of the pages the ad is delivered on, time of day, day of week and many others. This targeting allows the Agency to model the inventory used to fill the under delivery of a certain publisher to be as similar as possible to the publishers original inventory. So for example, if the Agency bought media from a travel publisher like National Geographic, then the Agency can specify that the under delivery should be filled with "travel pages" on the exchange.

Then the Agency sends the small piece of industry-standard software called an Ad Tag for the publisher to traffic. The Agency specifies to the Publisher how the Ad Tag should be executed in the contracted terms of the sale, i.e., user geographic locations, time of day, specified date range ("flight dates"), quantity, and other parameters.

The Publisher then traffics the tags and sets the campaign live as per the terms specified by the Agency. As impressions, clicks and actions are served for the campaign, the Agency Ad Server logs what has been served and the amount of budget that has been spent. This is critical for the exchange Agency Trading Desk monitor being able to then monitor impressions, clicks and actions delivered versus the pace at which the publisher is expected to deliver.

Therefore, it must be determined if the campaign is under delivering. If the campaign is not under delivering, then the campaign proceeds until the campaign is to be terminated. If the campaign is not pacing to deliver the target budget, then the exchange Agency Trading Desk automatically starts serving impressions for the campaign to fill the under delivery. This process continues with exchange Agency Trading Desk monitoring the impressions, clicks, actions delivered versus the pace at which the publisher is expected to deliver until the campaign has reached its completion. Missing from the prior art models is the mechanism and assurance that enables advertisers and agencies who make a media buy to fulfill their advertising budget completely. Thus, the monitoring of the campaign delivery and the automatic delivery of additional impressions from the exchange to cover the under delivery, satisfies the long-felt need of ensuring complete delivery of advertising inventory so an agency can bill the client for the budget in its entirety.

Once the campaign has reached the end of its campaign, the Agency pays the Publisher for the inventory delivered by the Publisher. Payment is made up to the maximum specified by the Agency. If the publisher under delivered, then the Agency pays the publisher for the amount delivered by the Publisher. If exchange did pick up the under delivery, then the agency pays the exchange for the campaign inventory delivered by the exchange up to the maximum of the campaign budget.

FIG. 5 is a screenshot illustrating an example wherein if the Agency representing National Geographic catches up towards the end of the campaign, the exchange will not charge for any delivery above the placement budget. As exhibited in FIG. 3, the Open IO Discount is $250.00 which indicates the amount that the exchange will not charge the Agency. This amount of insurance or risk that the exchange will provide is based on an algorithm that one of skill in the art could generate and implement.

Thus, while there have been shown, described, and pointed out fundamental novel features of the invention as applied to several embodiments, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein. Use of absolute terms, such as "will not," "will," "shall," "shall not," "must," and "must not," are not meant to limit the present invention as the embodiments disclosed herein are merely exemplary.

CONCLUSION

Having now described preferred embodiments of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, and equivalents or similar purpose, unless expressly stated otherwise. Therefore, numerous other embodiments of the modifications thereof are contemplated as falling within the scope of the present invention as defined by the appended claims and equivalents thereto.

For example, the present invention may be implemented in hardware, software, a combination of the two, as well as in one or more computer websites executing on electronic devices such as personal digital assistants (PDAs) and programmable computers. Each device should include a processor, a storage medium readable by the processor (including volatile and non-volatile memory and/or storage elements), at least one input device and one or more output devices. The output information is applied to one or more output devices.

In the manner described above, the present invention thus provides an open network system and method for IO operation with an exchange for Internet ad media. While this invention has been described with reference to the preferred embodiments, these are illustrative only and not limiting, having been presented by way of example. Other modifications will become apparent to those skilled in the art by study of the specification and drawings. It is thus intended that the following appended claims include such modifications as fall within the spirit and scope of the present invention.

The invention claimed is:

1. An ad media exchange system for trading ad media including an ad media exchange server in communication with the Internet, the server comprising:
   a processor; and
   a processor memory accessible to the processor;
   wherein the processor memory stores a monitoring module executable by the processor, and programmed to cause the processor to:
      receive ad campaign information for an advertiser, the ad campaign information including a campaign budget, ad-request information, a campaign duration, and a volume of advertising to be delivered by a first publisher over a duration of the ad campaign, the campaign budget to be expended in per-delivery fees as the first publisher delivers the advertising over the internet;
      during the course of the duration of the ad campaign, to monitor a performance of the first publisher in delivering the advertising, and based on the monitoring, to compute a prediction of whether the publisher is likely to deliver the advertising at the budgeted volume during the duration of the ad campaign;
      if the prediction is that the volume of advertising to be delivered is likely to fall below the budgeted volume by the conclusion of the ad campaign, to compute an estimate of an additional volume of advertising delivery required to bring the volume of delivered advertising up to the budgeted volume at the conclusion of the campaign, the estimate based at least in part on the monitored rate of delivery and the remaining duration of the ad campaign;
      identifying a second publisher consistent with the ad request information, and by computer, arranging delivery of the additional advertising volume through the identified second publisher, arrangements between the first and second publishers and advertiser providing that payment by the advertiser for the advertising not exceed the campaign budget in the event that the total advertising delivered by the first and second publishers exceeds the campaign budget;
      by computer, continuing to monitor delivery by the first and second publishers, and instructing delivery of the estimated additional volume for internet delivery by the second publisher for so long as delivery by the first publisher alone is predicted to be likely to fall below the budgeted volume.

2. The system of claim 1, wherein the processor memory further stores a tag routing module executable by the processor to perform the step of:
   forwarding ad tag information for the campaign to at least one other publisher for delivering the additional volume of ad-request inventory.

3. The system of claim 2, wherein the monitoring module is further executable by the processor to perform the steps of:
   determining at the conclusion of the campaign that the number of impressions delivered from the volume of ad-request inventory by the publisher and the additional volume of ad-request inventory by the ad exchange exceeded the campaign budget; and
   causing the ad media exchange to charge no fee for a number of impressions served from the additional volume of ad-request inventory equal to the number of delivered impressions in excess of the campaign budget.

4. The system of claim 1, wherein the volume of ad-request inventory to be delivered by the publisher comprises impressions and an expected cost of impressions to be delivered by the publisher over the ad campaign duration is a function of a pace of delivery of impressions and of one or more of a click rate or an action rate associated with the delivered impressions.

5. The system of claim 1, wherein the ad-request inventory comprises inventory of a type selected from the group consisting of ad impressions, ad clicks and ad conversions.

6. The system of claim 1, wherein the additional volume of ad-request inventory is limited to having a cost that does not exceed a predetermined portion of the campaign budget.

7. A method comprising the steps of:
   receiving at a computer a specification of an ad campaign to place internet advertising with a first internet publisher on behalf of an advertiser, the campaign specification specifying a campaign budget, ad request information, a campaign duration, and a volume of advertising to be delivered by the first publisher, the budget to be expended in per-delivery fees as the first publisher delivers the advertising over the internet;
   during the course of the duration of the ad campaign, by computer, monitoring delivery of the advertising by the first publisher, and based on the monitoring, computing a prediction of whether the first publisher is likely to deliver sufficient deliveries to consume the budgeted volume during the duration of the ad campaign;
   if the prediction is that the volume of advertising to be delivered is likely to fall below the budgeted volume at the conclusion of the ad campaign, by computer, computing an estimate of an additional volume of advertising delivery required to bring the volume of delivered advertising up to the budgeted volume at the conclusion of the campaign, the estimate based at least in part on the monitored rate of delivery and the remaining duration of the ad campaign;
   identifying a second publisher consistent with the ad request information, and by computer, arranging delivery of the additional volume of advertising through the identified second publisher, arrangements between the first and second publishers and advertiser providing that payment by the advertiser for the advertising not exceed the campaign budget in the event that the total advertising delivered by the first and second publishers exceeds the campaign budget; and
   by computer, continuing to monitor delivery by the first and second publishers, and instructing delivery of the estimated additional volume for internet delivery by the second publisher for so long as delivery by the first publisher alone is predicted to be likely to fall below the budgeted volume.

8. The method of claim 7, further comprising the step of:
   forwarding ad tag information for the campaign to at least one publisher for delivering the additional volume of advertising.

9. The method of claim 7, further comprising the step of:
receiving with the ad campaign specification a specification of a portion of the campaign budget permitted to be covered by additional volume that may be obtained through a second publisher.

10. The method of claim 7, further comprising the steps of:
determining a discount fee amount for the advertiser when a volume of advertising delivered by a publisher exceeds the purchased volume of advertising.

11. The method of claim 7, wherein:
the campaign specification specifies per-delivery fees based on delivered impressions.

12. The method of claim 7, wherein:
the campaign specification specifies per-delivery fees based on cost-per-thousand or other aggregated cost-per-click.

13. The method of claim 7, wherein:
the campaign specification specifies per-delivery fees based on cost-per-action.

14. The method of claim 7, further comprising the step of:
receiving with the ad campaign specification a specification of a type of advertising inventory that may be used to fill estimated additional volume.

15. The method of claim 7, wherein:
the specification of a type of advertising inventory specifies geographic region.

16. The method of claim 7, wherein:
the specification of a type of advertising inventory specifies time of day for delivery.

17. The method of claim 7, wherein:
the specification of a type of advertising inventory specifies subject matter for pages of the second publisher with which the additional advertising is to be delivered.

* * * * *